United States Patent
Robbins, III et al.

(10) Patent No.: US 6,284,341 B1
(45) Date of Patent: *Sep. 4, 2001

(54) FOLDABLE DESK CHAIRMAT WITH HANDLES AND HANG TABS

(75) Inventors: Edward S. Robbins, III, 2802 E. Avalon Ave., Muscle Shoals, AL (US) 35662; William G. Newman, Muscle Shoals, AL (US); Gary L. House, Rogersville, AL (US); John D. Carlton, Florence, AL (US)

(73) Assignee: Edward S. Robbins, III, Muscle Shoals, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/684,967

(22) Filed: Oct. 10, 2000

Related U.S. Application Data

(63) Continuation-in-part of application No. 09/327,173, filed on Jun. 7, 1999, now abandoned, which is a continuation-in-part of application No. 09/238,737, filed on Jan. 28, 1999, now Pat. No. 6,183,833.

(51) Int. Cl.[7] ....................................................... B32B 3/06
(52) U.S. Cl. ................................. 428/67; 428/81; 428/80; 428/156; 428/167; 428/192; 428/217; 428/99
(58) Field of Search .................................. 428/80, 81, 67, 428/99, 156, 167, 192, 217; 383/4; 248/346.01; 5/417

(56) References Cited

U.S. PATENT DOCUMENTS

| | | |
|---|---|---|
| 3,323,151 | 6/1967 | Lerman . |
| 4,370,767 | 2/1983 | Fraser . |
| 4,476,174 | 10/1984 | Carrera . |
| 4,574,101 | 3/1986 | Tricca et al. . |
| 4,784,888 | 11/1988 | Schwertner et al. . |
| 4,926,512 | 5/1990 | Coyle . |
| 4,940,620 | 7/1990 | Silk et al. . |
| 5,059,476 | 10/1991 | Steiniger et al. . |
| 5,073,428 | 12/1991 | Lancelot et al. . |
| 5,190,200 | 3/1993 | Hammerlund . |
| 5,425,444 | 6/1995 | Chapman . |
| 5,439,405 | 8/1995 | Storey et al. . |
| 5,577,730 | 11/1996 | Vannozzi, Sr. . |
| 5,916,658 | 6/1999 | Mohr . |

*Primary Examiner*—Alexander S. Thomas
(74) *Attorney, Agent, or Firm*—Nixon & Vanderhye P.C.

(57) ABSTRACT

A desk chairmat adapted for use over a carpet and for supporting a desk chair, the chairmat comprising a semi-rigid substantially planar member, said member having four side edges with a lip portion adapted to extend into a well area under the desk; an upper side of the chairmat having a substantially smooth surface; a pair of hang tabs formed integrally with said substantially planar member and projecting away from one of said four side edges, each said hang tab having a relatively small aperture formed therein and adapted to receive a display support member; said upper side of said planar member having at least one elongated groove formed therein and extending substantially between two of said four side edges; and a laminate strip pressed into a lower side of said planar member in alignment with said at least one elongated groove to thereby form a fold hinge in said planar member.

27 Claims, 6 Drawing Sheets

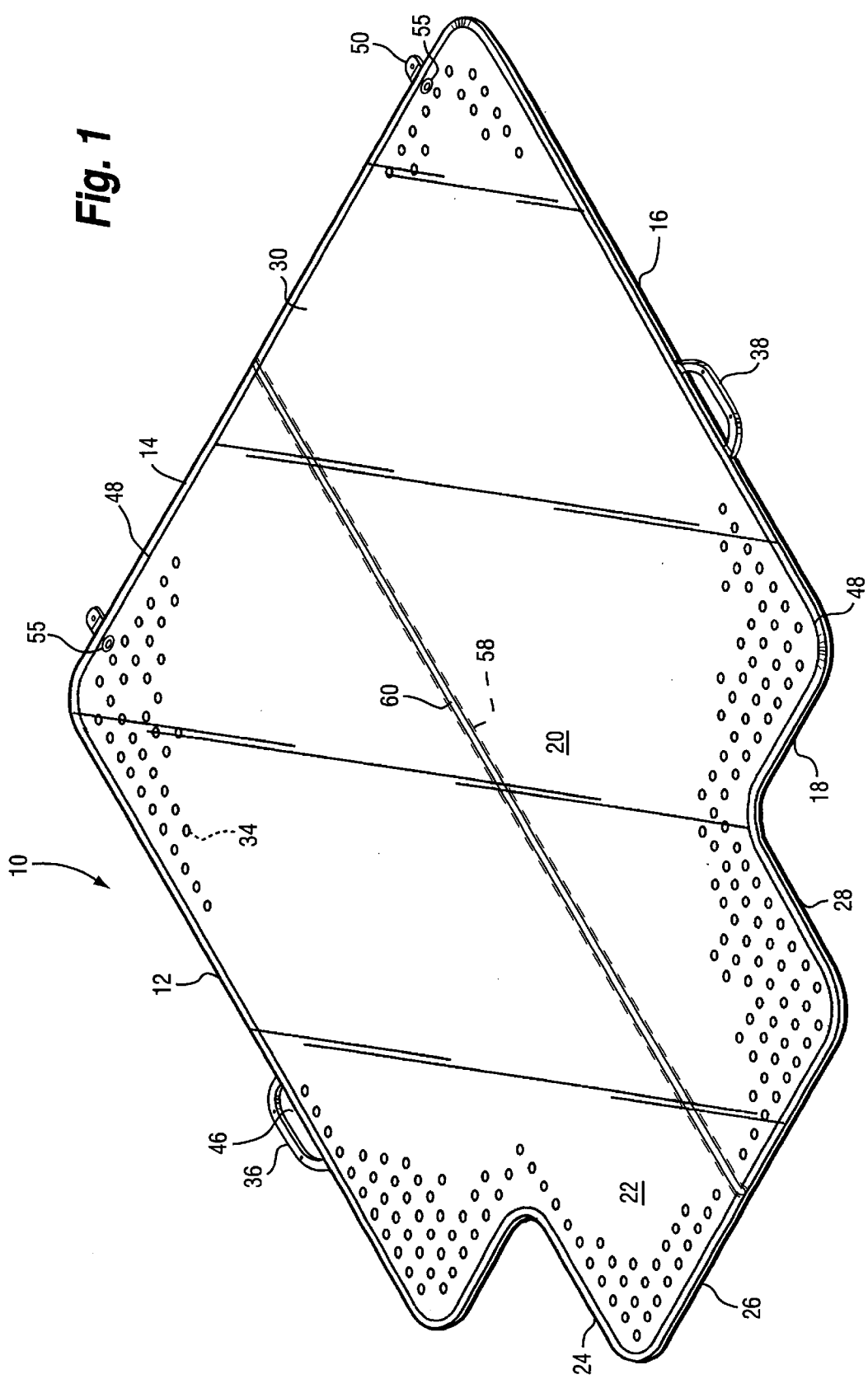

FOLDABLE DESK CHAIRMAT WITH HANDLES AND HANG TABS

RELATED APPLICATIONS

This application is a continuation-in-part of application Ser. No. 09/327,173 filed Jun. 7, 1999, abandoned, and application Ser. No. 09/238,737 filed Jan. 28, 1999, now U.S. Pat. No. 6,183,833.

This application is also generally related to application Ser. No. 09/097,586, filed Jun. 16, 1998 entitled "Desk Chairmat With Handles And Related Process", U.S. Pat. No. 6,177,165; and application Ser. No. 09/110,205, filed Jul. 6, 1998 also entitled "Desk Chairmat With Handles And Related Process" abandoned.

TECHNICAL FIELD

This invention relates to chairmats and specifically, to chairmats typically used under desk chairs in order to protect the underlying carpet or hard flooring.

BACKGROUND

Desk chairmats for office and home use are well known. Such chairmats typically have a main portion on which the desk chair rolls, and a forward lip portion which is adapted to extend partially under the desk well, and on which the feet of the person sitting in the chair may rest. Desk chairmats which are to be applied over carpeting typically have short but relatively sharp spikes on the undersides thereof which hold the mats firmly in place.

The above described desk chairmats, and particularly those with spikes, are difficult to carry and/or otherwise handle due to their relatively large size and the semi-rigid nature of the material from which they are formed. Unless the chairmat is boxed or otherwise protected, the user typically carries the chairmat by gripping about one or two of the edges of the chairmat, often resulting in irritation if not injury to the hands, due to the spikes projecting from the underside of the chairmat.

Some attempts have been made to solve the problem, but only to the extent of making the chairmats foldable to thereby reduce their size for handling purposes. See, for example, U.S. Pat. No. 5,073,428 and commonly owned U.S. Pat. No. 4,784,888.

For the most part, desk chairmats have been sold at office supply stores or distributors as opposed to retail stores, so that to some extent, the handling problem was alleviated by boxing the chairmats individually or in groups prior to shipping. However, even when supplied from a distributor in boxed form, the end user has to remove the chairmat from the box and carry it to its final destination, again, with some difficulty due to the physical attributes of the chairmat. In any event, chairmats are now being found increasingly in retail outlets, compounding the problem and while it is recognized that the chairmats may be boxed, the fact is that boxes add cost and are themselves unwieldy, and are therefore not likely to be used to any great extent in the retail environment. Thus, with increasing retail activity, new displays are also required. Conventional chairmats, because of their bulky and somewhat unwieldy configuration, present display problems since, absent the use of boxes, they do not stand alone unless wound. Even standing on edge in a wound or partially wound state, however, the mats are relatively unstable and, in any event, this is not a viable display arrangement.

Accordingly, there remains a need for a solution to the problem of transporting desk chairmats easily and safely, particularly those chairmats which have carpet spikes, and to the problem of displaying and stocking chairmats in a retail environment.

SUMMARY OF THE INVENTION

This invention relates to the incorporation of integral handles and hang tabs in desk chairmats. One prior impediment to putting permanent handles on a desk chairmat, or within the periphery of the mat, was that the handles themselves might interfere with the desired free rolling of chair casters on the chairmat. For example, if such handles were to be applied to the chairmat, one can imagine the desk chair casters or user's shoe heels becoming caught within a handle opening.

In accordance with this invention, foldable desk chairmats with handles are disclosed which solve the handling problem and which can be easily removed by the purchaser with, for example, a pair of scissors. In addition, the desk chairmats have one or more integral hang facilitating mechanisms.

In a first exemplary embodiment, integral handles are molded in place on opposite sides of the chairmat. With this arrangement, the chairmat may be pulled together (by a partial rolling or folding of the chairmat with the carpet spikes facing inwardly) so that the two handles align, thereby not only reducing the profile of the chairmat, but also forming a single stronger handle enabling the user to carry the chairmat without difficulty. In this exemplary embodiment, the handles are connected to the respective chairmat edges by webs which permit the handles to be cut away from the chairmat once the chairmat is in its final location. Tear-away or other handle arrangements as described in the above identified commonly owned applications may also be utilized.

It is another feature of the invention to include one or more integral hang tabs along one or more sides of the chairmat to facilitate display and stocking, particularly in the retail environment. The tab may be in the form of an integral strap or loop, or a solid tab with a hole sized to fit over a display hook. Alternatively, the handle straps or loops themselves may have one or more apertures for purposes of hanging the mat. In still another alternative, one or more holes may be formed within the mat periphery to facilitate hanging.

It is another feature of the invention to include, optionally, aligned longitudinal grooves on both sides of the mat, extending midway between and parallel to those edges on which the handles are located, thereby providing an integral hinge, facilitating the folding of the chairmat and the bringing of the handles into engagement, to thereby permit easier transport due to reduced overall profile of the mat. In another version, only a single groove on the top surface of the mat is utilized to provide a folding hinge. In still another version, a longitudinal strip of material more flexible than the material from which the mat is made, is located directly below the single longitudinal groove in the upper surface of the chairmat. In one example, the flexible laminate strip is pressed into the lower surface of the mat material as the material exits an extrusion die in a molten state, thus becoming part of the mat itself. While the material is still in at least a partially molten state, the longitudinal groove is embossed into the opposite (upper) surface of the mat by a groove forming roller. In the exemplary embodiment, the chairmat is made of a semi-rigid PVC material whereas the laminate strip is made from a very flexible PVC material.

In an alternative arrangement, a pair of elongated grooves are formed in the top surface of the mat, directly above the laminate strip.

In still another embodiment, multiple parallel fold lines are provided in the mat, with a laminate strip and multiple grooves utilized to form each fold line.

Various other strip and groove combinations are possible and are considered within the scope of this invention.

Accordingly, in one aspect, the present invention relates to a desk chairmat adapted for use over a carpet and for supporting a desk chair, the chairmat comprising a semi-rigid substantially planar member, the member having four side edges with a lip portion adapted to extend into a well area under the desk; an upper side of the chairmat having a substantially smooth surface; a pair of hang tabs formed integrally with the substantially planar member and projecting away from one of the four side edges, each hang tab having a relatively small aperture formed therein and adapted to receive a display support member; the upper side of the planar member having at least one elongated groove formed therein and extending substantially between two of said four side edges; and a laminate strip pressed into a lower side of said planar member in alignment with said at least one elongated groove to thereby form a fold hinge in said planar member.

In still another aspect, a desk chairmat comprising a semi-rigid substantially planar member, the member having four side edges, an upper side of the chairmat having a substantially smooth surface; at least one hang tab attached to the chairmat along a first of the side edges, the hang tab comprising an integral projection with an aperture therein; a pair of integral handles along second and third opposite ones of the four side edges; the upper side of the planar member having at least one elongated groove formed therein and extending substantially between two of the four side edges; and a laminate strip pressed into a lower side of the planar member in alignment with the at least one elongated groove to thereby form a fold hinge in the planar member.

In still another aspect, the invention relates to a desk chairmat comprising a semi-rigid substantially planar member, the member having four side edges, an upper side of the chairmat having a substantially smooth surface; at least one hang tab attached to the chairmat along a first of the four side edges; at least one handle located along a second of the four side edges wherein the second of the four side edges is adjacent the first edge; the upper side of the planar member having at least one elongated groove formed therein and extending substantially between two of the four side edges; and a laminate strip pressed into a lower side of the planar member in alignment with at least one elongated groove to thereby form a fold hinge in the planar member.

In another aspect, the invention relates to a method of forming a fold line in a chairmat comprising: a) extruding a planar member having upper and lower surfaces; b) while in an at least partially molten state, pressing an elongated laminate strip into one of the upper and lower surfaces of the planar member; and c) while remaining in an at least partially molten state, embossing an elongate groove in the other of the upper and lower surfaces, wherein at least one elongate groove and the laminate strip are in substantial vertical alignment.

Additional features and advantages of the subject invention will become apparent from the detailed description which follows.

BRIEF DESCRIPTION OF THE DRAWINGS

FIG. 1 is a perspective view of a chairmat in accordance with a first exemplary embodiment of the invention;

BEST MODE FOR CARRYING OUT THE INVENTION

Figure 3:
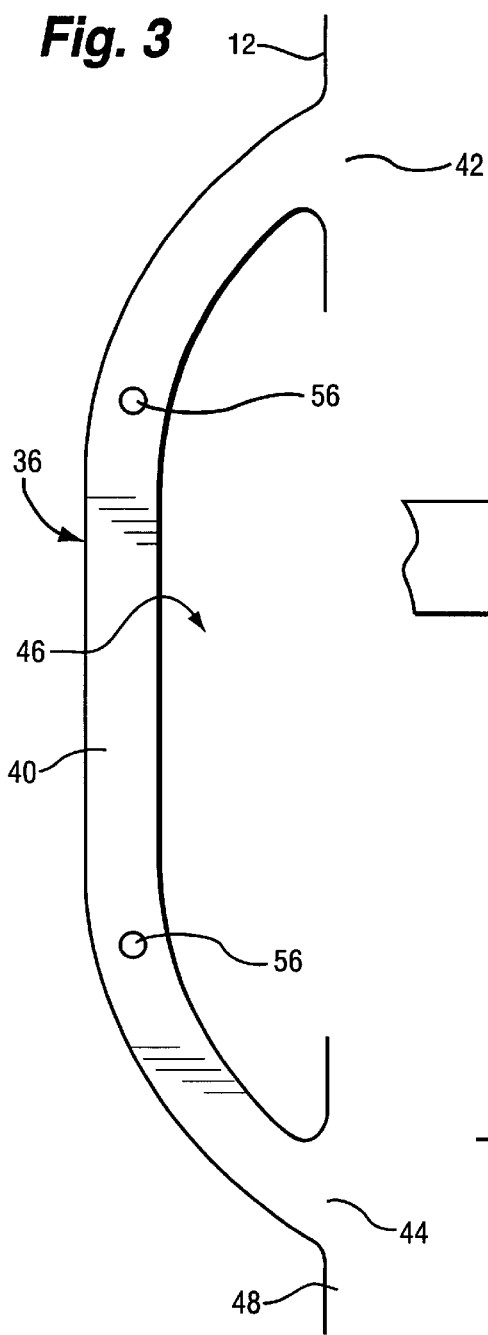
FIG. 3 is an enlarged detail illustrating a chairmat handle in accordance with the invention.

With reference to FIG. 1, a desk chairmat 10 includes a planar, semi-rigid member (made from, e.g., PVC, polypropylene, semi-rigid vinyl or other suitable material) having four side edges 12, 14, 16 and 18, which define a major portion 20 of the chairmat. An optional lip extension portion 22 of the same material and thickness, projects or extends integrally from side edge 18, and is further defined by edges 24, 26, 28. The lip extension 22, as is well known, is designed to project into the well area of a desk, with the remainder of the chairmat behind the desk and serving as the principal contact area for a desk chair (not shown) typically (but not necessarily) fitted with rollers or casters. The chairmat for purposes of this invention, however, need not have a lip extension of this type. The upper surface 30 of the chairmat is generally smooth, while the lower surface may be formed with a substantial number of relatively short but relatively sharp spikes 34 which are used to anchor the chairmat to an underlying carpet. As is well understood in the art, chairmats for use on hard flooring do not require such spikes. Note that spikes are not shown in all of the various mats illustrated in the Figures, and while the invention here is particularly beneficial in those instances where spikes are present, it is, of course, applicable to mats without spikes as well.

In accordance with an exemplary embodiment of this invention, the chairmat 10 is formed with a pair of integral handles 36, 38 which project from opposite side edges 12 and 16, i.e., the handles lie outside the periphery of the chairmat. While the location of the handles can vary, placing them along the longer sides of the chairmat is preferred since it requires minimal folding/rolling (as described below) and because, as folded, it produces a substantially cylindrical package of less height which is easier to carry. It is also advantageous to locate the handles in alignment with the center of mass of the chairmat so that the latter is balanced when gripped by the aligned handles. Since the handles 36, 38 are identical, only one need be described in detail.

Figure 5:
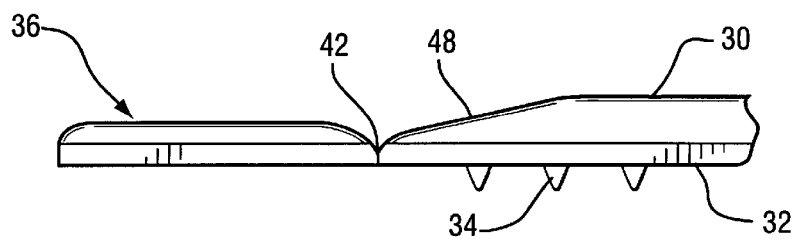
FIG. 5 is a partial end view of the chairmat shown in FIG. 1.

With further reference to FIG. 3, handle 36 comprises a loop 40 connected at opposite ends thereof to the edge 12 along a pair of webs 42, 44, each of which having a length of about ⅜", but this dimension may vary. The loop 40 is arranged to form a handle opening 46. Note also that in the presently described embodiment, the chairmat is formed with an otherwise known ramp or tapered marginal edge 48 (FIGS. 3 and 5) which extends about the entire periphery of the chairmat. Thus, where the handle loop 40 is joined to the edge 12 along the pair of webs 42, 44. The handle loop thickness may be the same as (but is preferably less than) the maximum thickness of the chairmat. This arrangement results in a handle which is easily cut away from the mat.

The above described chairmat constructions can be made in accordance with various known plastic forming techniques including stamping of preformed sheets. The preferred technique, however, is as described in commonly owned U.S. Pat. No. 5,213,741, incorporated herein by reference.

Note that while the handles are described in terms of a "pair" of such handles, single handles may be used as well. In addition, the one or two handles can be located along any of the side edges of the chairmat. Moreover, the shape of the handle, i.e., arcuate, rectangular, etc. may also be varied as desired.

Figure 4:
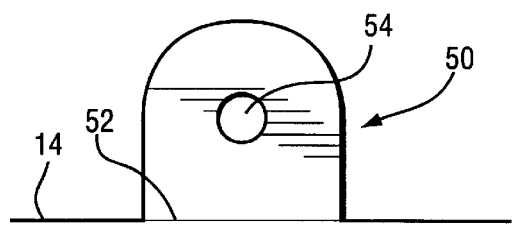
FIG. 4 is an enlarged detail of a hang tab in accordance with the invention.

It is another feature of this invention to include one or more hang tabs 50 along one or more side edges of the chairmat. FIG. 1 shows two such hang tabs along side edge 14. As best seen in FIG. 4, tab 50 is a solid protrusion or projection integrally formed with the mat, and connected along a thinned web 52 (similar to web 44 associated with handles 36, 38). Tabs 50 are formed with holes or apertures 54 which enable the mat to be suspended from display hooks or the like.

In a variation of this design, one or more small holes 55 may be formed within the periphery of the mat to facilitate hanging.

Alternatively, handles 36, 38 may be provided with holes 56 (see FIG. 3) so that the handles themselves may also serve as hang tabs if desired.

Figure 2:
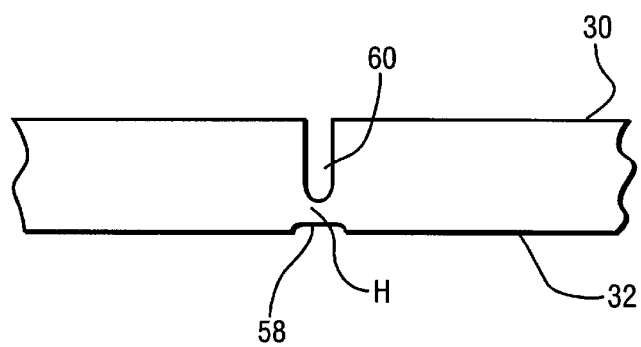
FIG. 2 is a partial front view of the chairmat shown in FIG. 1.

With reference now to FIGS. 1 and 2, a unique folding arrangement in the chairmat 10 is illustrated. More specifically, the fold line is provided in the form of a first elongated groove 58 in the underside 32 of the mat, and a second, elongated groove 60 on the top surface 30, in generally vertical alignment with groove 58. The upper groove 60 is approximately 0.125 inch wide and extends about 0.080 into the thickness of the mat. Groove 58, on the other hand, is about 0.250 inch wide and has a depth of only about 0.005 inch. In this example, the "connecting web" between the two grooves is about 0.008 inch thick and creates a "living hinge" H which permits easy folding. The living hinge thickness may vary, however, from about 0.008 to about 0.020 inch.

It is preferable that the grooves 58, 60 extend substantially the full length of the mat terminating immediately adjacent the tapered ramp 48, i.e., about 1 inch short of the edges. It is possible, however, to extend the grooves fully through the tapered ramp edges.

Figure 6:
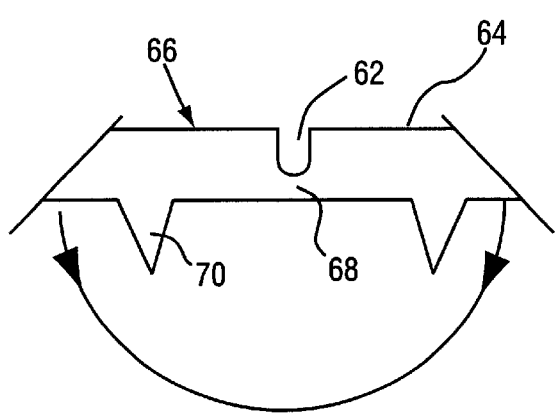
FIG. 6 is a partial front view of a chairmat in accordance with another exemplary embodiment of the invention.
Figure 7:
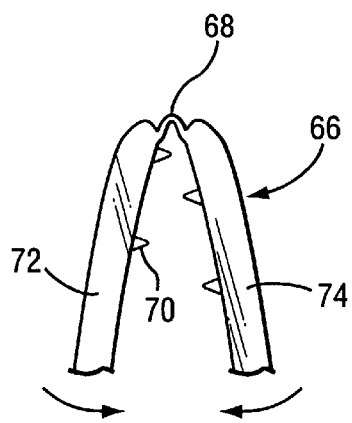
FIG. 7 is a partial front view of the mat shown in FIG. 6 but with the mat folded about a center hinge.

In FIGS. 6 and 7, an alternative groove configuration is illustrated. Specifically, a single substantially U-shaped groove 62 extends along only the top surface 64 of the chairmat 66, extending to a depth of about 0.080 inch. This leaves a thin web or "living hinge" 68, having a thickness of about 0.020 inch.

FIG. 7 shows the manner in which the mat is easily folded inwardly to hide or cover the carpet spikes 70, with the living hinge 68 permitting the two half portions 72, 74 of the mat 66 to lie substantially parallel to one another without any significant stretching of the mat in the area of the hinge.

Figure 8:
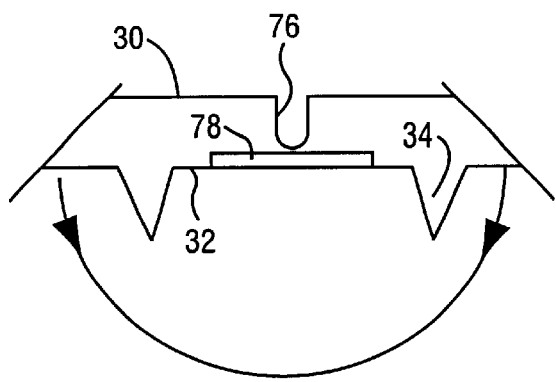
FIG. 8 is a partial section through the mat of FIG. 1, showing the hinge groove and laminate strip in accordance with the invention.

FIG. 8 illustrates a unique hinge arrangement in accordance with the present invention that includes an elongated groove 76 embossed in the top surface 30 of the mat, extending from the forward edge 26 to the rearward edge 14 of the mat. The groove may extend to a depth of about 0.080 inch, but may vary depending on the thickness of the mat. The latter may range from about 0.098 inch to 0.145 inch.

A laminate strip 78 is embedded within the mat itself, and specifically pressed into the lower surface 32 of the mat. The laminate strip 78 also extends from the forward to the rearward edge of the mat, i.e., it is coextensive with the length of the groove 76. The laminate strip 78 may be from 1 to 4 inches wide and about 0.040 inch thick. There may be a thin residual web of mat material between the groove and the laminate strip, but the groove or grooves may extend to the strip itself. It will be appreciated however, that the strip may have other cross-sectional shapes, such as square, triangular, round, etc.

Figure 9:
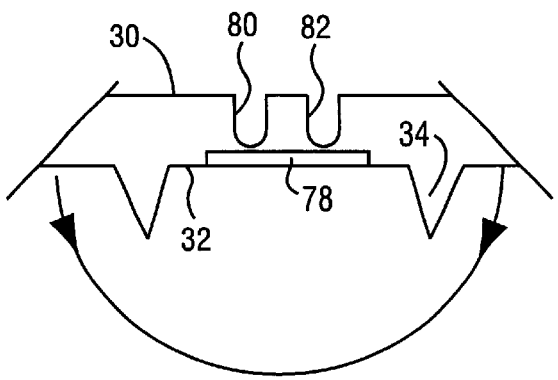
FIG. 9 is a view similar to FIG. 8 but illustrating a pair of hinge grooves opposite the laminate strip.

FIG. 9 illustrates a variation wherein a pair of elongated grooves 80, 82 are embossed into the upper surface 30 of the mat, directly above the laminate strip 78. The groove or grooves are sufficiently small in width that they do not interfere with the rolling of chair casters across the mat.

The above described arrangement facilitates the folding of the chairmat about the groove 76 or about the grooves 80, 82 in the directions shown in FIGS. 8 and 9, thus insuring that the spikes 34 fold inwardly so as to be protected by the upper surface 30 of the mat.

It will be appreciated however, that the groove(s) and laminate strip location could be reversed, if desired, so that the lower surface 32 (and spikes 34) of the mat would be exposed after folding.

Figure 10:
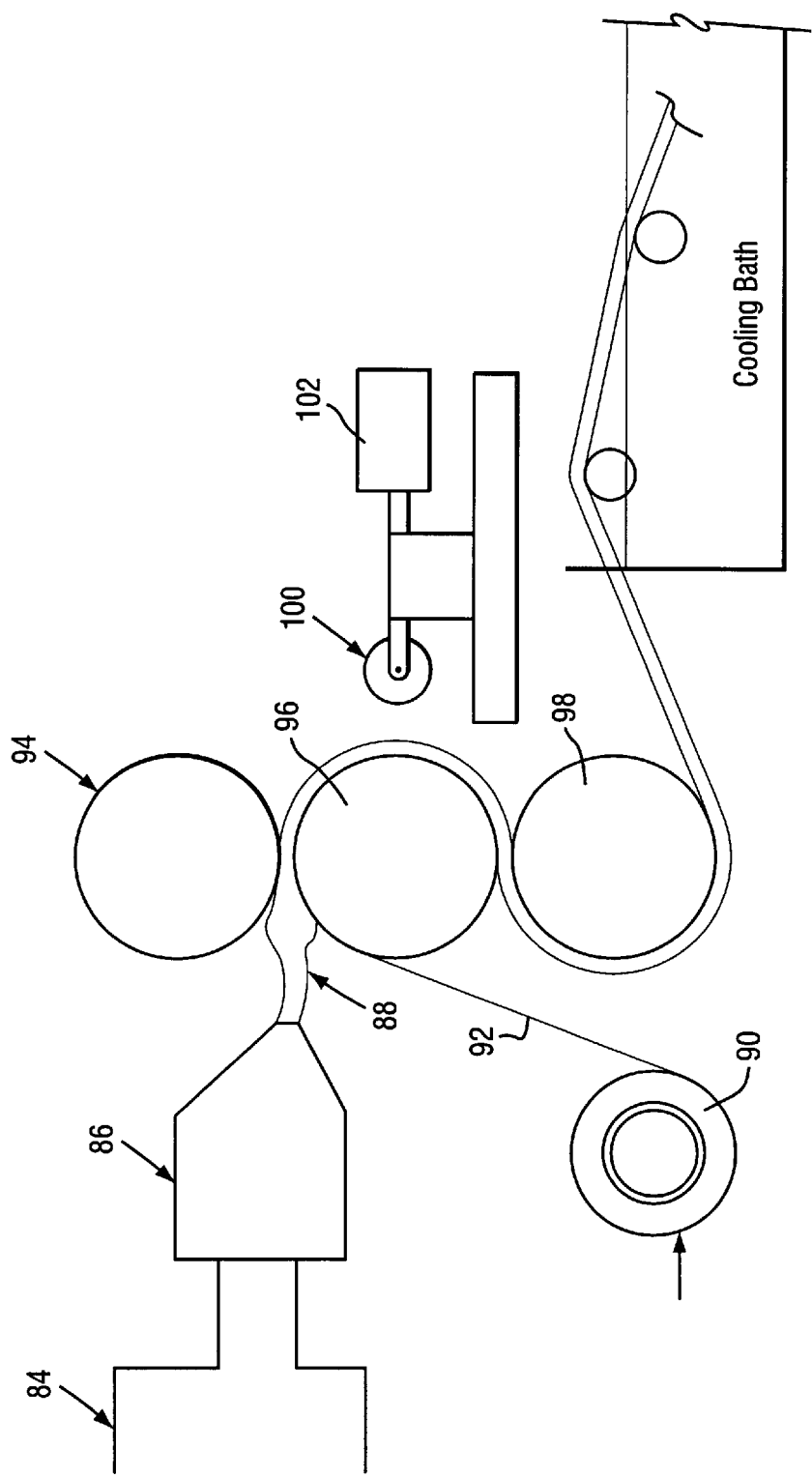
FIG. 10 is a schematic side elevation of apparatus utilized to form the chairmat in accordance with the invention.

With reference now to FIG. 10, an apparatus is disclosed which may be utilized to form the chairmat shown in FIGS. 1 and 2. An extruder 84 feeds molten plastic material to a die 86, with extrudate in molten form exiting the die as shown at 88. A feed roller 90 supplies a strip of laminate material 92 (corresponding to strip 78 in FIGS. 8, 9) which is impressed into the extrudate 88 as the latter passes between a pair of pattern rolls 94 and 96. It will be understood that the pattern rolls in addition to pressing the laminate strip 92 into the extrudate 88, may also be shaped so as to form the spikes 34 projecting from the lower surface of the mat, as well as to profile the chairmat edge. As the extrudate passes around roll 96 and prior to entry into the nip between rolls 96 and 98, a groove forming roller 100 actuated by a suitable mechanism 102 moves forward into engagement with the extrudate while it is still in molten (or at least partially molten) form, to emboss the one or more grooves 76 or 80 and 82 into the upper surface 30 of the mat. After the mat passes about the roller 98, it moves into a cooling bath 104 where it is cooled and thus solidified. It will be appreciated that the roller 100 is profiled along its axial length to form the one groove 76, or the pair of grooves 80, 82 in the chairmat upper surface as desired.

The plastic material forming the mat itself is preferably PVC with a hardness within the range of 40 to 80 Shore D and preferably, between 66 to 68 Shore D. The laminated strip is preferably a more flexible PVC material with a hardness of 60 to 90 Shore A, and preferably 68 to 78 Shore A.

Turning now to FIGS. 11–14, an alternative embodiment of the chairmat is disclosed with multiple fold lines. Specifically, the chairmat 106 has an upper surface 108 and a lower surface 110, a forward edge 112 including lip extension edges 114, 116 and 118; a pair of side edges 120, 122 and a rearward edge 124. Spikes 126 project from the lower surface 110.

Figure 11:
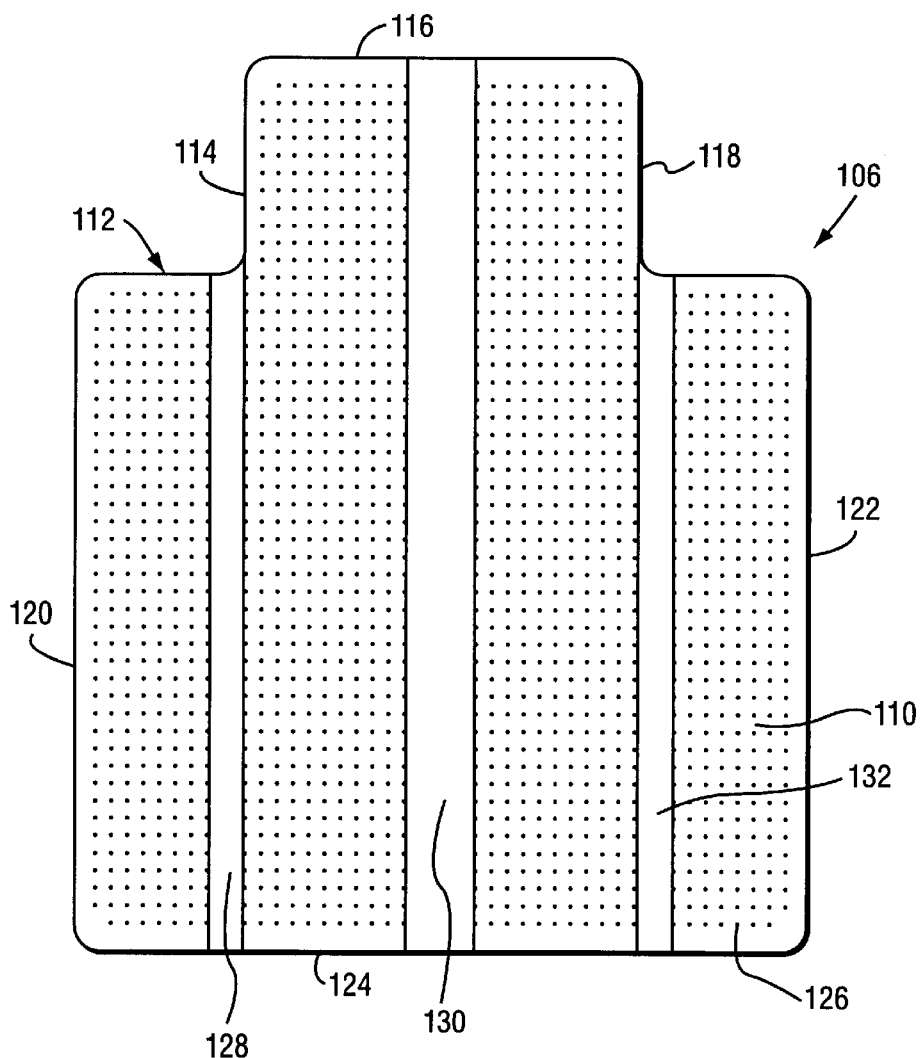
FIG. 11 is a lower plan view of a chairmat in accordance with another exemplary embodiment of the invention.
Figure 12:
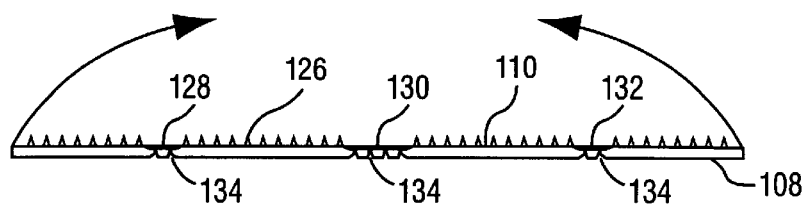
FIGS. 12–14 illustrate a sequence of steps for folding the mat shown in FIG. 11.
Figure 13:
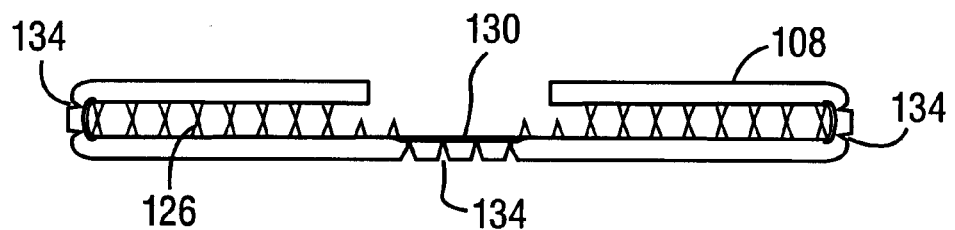
Figure 14:
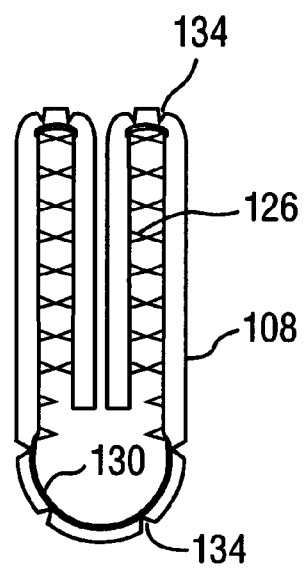

Laminate strips 128, 130 and 132 are pressed into the lower surface 110, one centered on the longitudinal centerline of the mat, the other two aligned generally with edges 114, 118, so as to define three parallel fold lines, best seen in FIG. 11. The laminate strips 128, 130 and 132 are pressed into the lower surface 110 of the chairmat as described above in connection with FIG. 10, but note that the width of the center strip 130 is larger than the flanking strips 128 and 132 to accommodate a larger fold as described below. Similarly, the number of grooves 134 embossed into the mat upper surface varies with the width of the laminate strip. Thus, for strips 128, 132, a pair of grooves 134 are utilized, while for strip 130, four discrete, parallel grooves 134 are employed. FIGS. 12–14 illustrate a folding sequence for the mat 106. In a first step, the sides of the mat are folded inwardly about fold lines defined by strips 128 and 132 (and associated grooves 134) to the position shown in FIG. 13. Then, the already folded side portions are folded inwardly about the center fold line defined by strip 130 (and associated grooves 134), to the position shown in FIG. 14. In this configuration, all spikes 126 are hidden and the mat is significantly reduced in size to facilitate easy carrying with the aid of, e.g., detachable handles generally as described in the commonly owned applications identified above, but relocated as necessary to the most convenient mat edge.

Here again, the fold line arrangements may be reversed and/or combined to include both inside and outside fold lines as desired. In addition, the fold lines may extend transversely to those shown in FIGS. 1 and 11, i.e., extend between side edges 12 and 16 or 120 and 122.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A desk chairmat adapted for use over a carpet and for supporting a desk chair, the chairmat comprising a semi-rigid substantially planar member, said member having four side edges with a lip portion adapted to extend into a well area under the desk; an upper side of the chairmat having a substantially smooth surface; a pair of hang tabs formed integrally with said substantially planar member and projecting away from one of said four side edges, each said hang tab having a relatively small aperture formed therein and adapted to receive a display support member; said upper side of said planar member having at least one elongated groove formed therein and extending substantially between two of said four side edges; and a laminate strip pressed into a lower side of said planar member in alignment with said at least one elongated groove to thereby form a fold hinge in said planar member.

2. The desk chairmat of claim 1 wherein a pair of parallel grooves are embossed in said upper surface, and said laminate strip is pressed into said lower surface.

3. The desk chairmat of claim 1 wherein a plurality of spikes project from said lower side of said planar member.

4. The desk chairmat of claim 1 wherein said laminate strip is made of material more flexible than material of which the planar member is made.

5. The desk chairmat of claim 4 wherein said laminate strip is PVC with a hardness in the range of 60–90 Shore A.

6. The desk chairmat of claim 1 wherein said laminate strip has a width from 1 to 4 inches.

7. The desk chairmat of claim 1 wherein said laminate strip has a thickness of about 0.040 inch.

8. The desk chairmat of claim 1 wherein said groove has a depth of about 0.080 inch.

9. The desk chairmat of claim 1 wherein a residual web of said semi-rigid planar member remains between said groove and said laminate strip.

10. A desk chairmat comprising a semi-rigid substantially planar member, said member having four side edges, an upper side of the chairmat having a substantially smooth surface; at least one hang tab attached to said chairmat along a first of said side edges, said hang tab comprising an integral projection with an aperture therein; a pair of integral handles along second and third opposite ones of said four side edges; said upper side of said planar member having at least one elongated groove formed therein and extending substantially between two of said four side edges; and a laminate strip pressed into a lower side of said planar member in alignment with said at least one elongated groove to thereby form a fold hinge in said planar member.

11. The desk chairmat of claim 10 wherein a pair of parallel grooves are embossed in said upper surface, and said laminate strip is pressed into said lower surface.

12. The desk chairmat of claim 10 wherein a plurality of spikes project from said lower side of said planar member.

13. The desk chairmat of claim 10 wherein said laminate strip is made of material more flexible than material of which the planar member is made.

14. The desk chairmat of claim 13 wherein said laminate strip is PVC with a hardness in the range of 60–90 Shore A.

15. The desk chairmat of claim 10 wherein said laminate strip has a width from 1 to 4 inches.

16. The desk chairmat of claim 10 wherein said laminate strip has a thickness of about 0.040 inch.

17. The desk chairmat of claim 10 wherein said groove has a depth of about 0.080 inch.

18. The desk chairmat of claim 10 wherein a residual web of said semi-rigid planar member remains between said groove and said laminate strip.

19. A desk chairmat comprising a semi-rigid substantially planar member, said member having four side edges, an upper side of the chairmat having a substantially smooth surface; a pair of hang tabs attached to said chairmat along a first of said four side edges, each having a tab comprising an integral projection with an aperture therein; a pair of handles located along second and third opposite ones of said four side edges; said upper side of said planar member having at least one elongated groove formed therein and extending substantially between two of said four side edges; and a laminate strip pressed into a lower side of said planar member in alignment with said at least one elongated groove to thereby form a fold hinge in said planar member.

20. The desk chairmat of claim 19 wherein a pair of parallel grooves are embossed in said upper surface, and said laminate strip is pressed into said lower surface.

21. The desk chairmat of claim 19 wherein a plurality of spikes project from said lower side of said planar member.

22. The desk chairmat of claim 19 wherein said laminate strip is made of material more flexible than material of which the planar member is made.

23. The desk chairmat of claim 22 wherein said laminate strip is PVC with a hardness in the range of 60–90 Shore A.

24. The desk chairmat of claim 19 wherein said laminate strip has a width from 1 to 4 inches.

25. The desk chairmat of claim 19 wherein said laminate strip has a thickness of about 0.040 inch.

26. The desk chairmat of claim 19 wherein said groove has a depth of about 0.080 inch.

27. The desk chairmat of claim 19 wherein a residual web of said semi-rigid planar member remains between said groove and said laminate strip.

* * * * *